United States Patent [19]

Maresh

[11] Patent Number: 5,624,527
[45] Date of Patent: Apr. 29, 1997

[54] ADHESIVE TAPE TUBE FORMER

[76] Inventor: Joseph D. Maresh, P.O. Box 645, West Linn, Oreg. 97068-0645

[21] Appl. No.: 324,169

[22] Filed: Oct. 14, 1994

Related U.S. Application Data

[60] Continuation-in-part of Ser. No. 125,252, Sep. 23, 1993, abandoned, which is a division of Ser. No. 14,725, Feb. 8, 1993, Pat. No. 5,376,202.

[51] Int. Cl.$^6$ .................................................. B29D 23/00
[52] U.S. Cl. ......................... 156/466; 156/510; 156/555
[58] Field of Search .................................. 156/203, 216, 156/466, 483, 484, 510, 543, 544, 555; 493/269, 288, 302, 276, 277, 278, 279, 280; 228/129, 130; 112/63; 72/51

[56] References Cited

U.S. PATENT DOCUMENTS

| | | | |
|---|---|---|---|
| 1,892,629 | 12/1932 | Pfeiffer | 156/218 |
| 2,133,620 | 10/1938 | Isenberg | 156/466 |
| 3,482,491 | 12/1969 | Gustafson | 493/276 |
| 3,485,147 | 12/1969 | Hurst | 493/288 |
| 3,495,506 | 2/1970 | Plymale | 156/218 |
| 3,747,483 | 7/1973 | Hurst | 493/287 |

*Primary Examiner*—Michael W. Ball
*Assistant Examiner*—Richard Crispino
*Attorney, Agent, or Firm*—Diversified Designs

[57] ABSTRACT

An apparatus for dispensing adhesive tape tubes with pressure sensitive adhesive oriented at the outer circumference there on. The tube is formed from standard one-sided pressure sensitive adhesive tape. A continuous tubular profile is established by passing the tape through a profile configurator with the adhesive orientated outwardly to cause the tape to be formed into a spiral cone with overlapping edges. The overlapping edges of the tape merge together radially and become in mutual adhesive contact beyond said configurator to form tubed tape of cylindrical characteristics with a longitudinal seam.

20 Claims, 6 Drawing Sheets

ADHESIVE TAPE TUBE FORMER

REFERENCE TO CO-PENDING RELATED APPLICATION

This application is a continuation-in-part of Ser. No. 08/125,252 filed Sep. 23, 1993, now abandoned which is a division of Ser. No. 08/014,725 filed Feb. 8, 1993, now U.S. Pat. No. 5,376,202.

BACKGROUND OF THE INVENTION

The prior art is replete with adhesive tape dispensing devices which in general support a tape roll, and provide a cutter or blade for tearing short lengths off of the roll at desired tape lengths. Often, as in schools and the like, it is desired to configure a short segment of pressure sensitive adhesive tape into a loop with the adhesive oriented at the outer circumference there on in order to affix papers of miscellaneous nature to windows and walls. It is desirable to apply tape to the back of the article so that the tape is not visible, and so that the front surface of the article will not be damaged. Other applications for looping tape include gift wrapping such as when bows or ribbons are attached to gift boxes, and party decorating as when balloons and other odd shaped articles ore affixed to walls. Craft making also presents purposes for looping tape, although the applications are much more varied.

The market has in part responded to this demand by manufacturing double sided tape which has the adhesive applied to both sides of the tape, but tape of this nature has not found favor for many of these applications for several functional reasons, in addition to a higher cost which is currently approximately twice that of single sided adhesive tape.

One functional reason for unsatisfactory performance of double sided tape in many of these applications pertains to poor adhesive strength when double sided tape is affixed between mutually nonparallel and/or irregular nonconforming surfaces. Subjected to such conditions, the effective surface-to-surface contact area is substantially reduced. The single layer of double sided tape simply cannot conform to two opposed surfaces spaced apart at a distance greater than the thickness of the tape, whereas a tape loop form will.

Another functional reason relates to removal difficulties of double sided tape when papers are to be taken down. During removal, the double sided tape will remain on the surface to which it has the greatest adhesion; and most often, as in the case when it has been applied to windows, must be scraped off of the glass with the use of a razor blade. If a piece of looped tape had been utilized, one would readily be able to pull the loop off with minimal difficulty. Removal damage to painted surfaces such as walls is also minimized when tape loops are utilized due the fact that the action of peeling a tape loop off is less likely to cause paint separation.

One invention which attempted to facilitate the formation of tape loops may be seen by U.S. Pat. No. 3,747,483, James A. Hurst; which discloses a device which incorporates a rod mandrel about which the tape is to be wound when forming a loop or tube. This invention did not achieve commercial success in part because the operator is still required to physically wind the tape. An earlier invention by the same, U.S. Pat. No. 3,485,147, provided a powered means to accomplish the same result, albeit in a costly and complicated manner.

Despite these options available to consumers, the enduring art of looping tape has remained as the popular choice, and a need has continued for the development of an inexpensive and efficient tape looper or tube former which greatly expedites the process.

BRIEF DESCRIPTION OF THE INVENTION

The present invention provides a means to continuously longitudinally form adhesive tape into a tube. The method direction of the present invention departs from the method direction of known prior art in that for a given loop diameter, the loop is respectively formed side over side with wide tape as opposed to end over end with narrow tape. The critical element necessary to accomplish this is referred to in this text as a profile configurator.

In accordance with the preferred embodiment of this invention, a frame or support is provided, to which a tape supply roll is rotatably secured. A tape deflector is provided in relatively close proximity to the tape supply roll in order to ensure that the tape will be directed from a constant direction to the profile configurator regardless of the reducing diameter of the supply roll as the tape is drawn off. The embodiments illustrated require a deflector for an additional reason in that the tape supply roll is not located at one end of the support. In all references to the component referred to as a deflector in this text, it is understood that the deflecting region is in actuality the only working area, and that any other extension or added contour is considered extraneous.

The profile distributor comprises an arcuate (spiral) overlapping narrow slot incorporated in a plate of material of minimal thickness. Typically, such a combination of requirements necessitates that the configurator be manufactured by molding or laser cutting.

The profile configurator is installed with the objective of curling the flat tape into a transverse overlapping spiral with the pressure sensitive adhesive oriented outwardly. Opposite tape edges pass through the profile configurator in an overlapping, mutually noncontacting fashion, such that a tubular form is developed thereafter. The profile configurator must, in all embodiments, minimize contact with the adhesive side of the tape. Furthermore, limitations exist as to the distance to be established between the profile configurator and the tape deflector. This distance must be sufficiently great as to allow the flat tape to be geometrically transformed into the proper transverse spiral. If the profile configurator is positioned too close to the tape deflector, it will not be possible for the spiral shape to correctly develop because the tape will seek to maintain a flat profile. Essentially, the opposite lateral edges of the tape will be subjected to tensile forces, and tape bunching will occur at those regions of the profile configurator which correspond closest to where the edges of tape would exist if the tape was unrestricted. If the tape deflector is modified to cause the tape to bow or bend laterally in a plane perpendicular to the tape path, or if the tape is partially preconfigured between the tape deflector and the configurator, then the distance between the profile configurator and the tape deflector may be reduced.

Conversely, if the profile configurator is located too far from the tape roll, again excluding considerations of tape deflectors or preconfigurators, unsatisfactory operation of this invention also will result. In this instance, the malfunction occurs beyond the output side of the configurator. In explaining this, the reader must consider that as the tape edges pass through the configurator, they converge and overlap without making mutual contact. In so doing, a spiral cone is formed between the deflector and the profile configurator. With increased distance between the tape deflector and the profile configurator, this cone angle is reduced. The resulting spiral cone caused to form at the profile configurator is therefore minimized, and tends to no longer form beyond the profile configurator to the effect that although the tape edges may be overlapping, they will not merge together radially in order to make mutual adhesive contact. All points along the tape path beyond the profile configurator tend to remain parallel, and because contact within the profile configurator is not allowed, the spiral profile remains open. Moreover, by increasing the distance between the tape roll and the profile configurator, improper establishment of the tubular form is also likely to occur if the lateral central region of the tack down platform is not utilized, i.e. proper tube formation becomes overly sensitive to lateral placement location of the tape tube onto the tack down platform. Despite these consequences due to increasing the distance between the deflector and the configurator beyond an optimum value, the magnitude of their effects upon tube formation are however are not as significant as decreasing such distance. As this apparatus is intended to be used as a relatively portable dispenser, it would be impractical, apart for the reasons given above, for the overall length of the assembled apparatus or assembled dispenser to exceed four or five feet in the tube longitudinal direction, regardless of tape width.

Regarding dimensions, upon experimentation it has been determined that if simply a flat tape deflector is utilized without a preconfigurator, then the distance between the deflector and the profile configurator in the formed tube longitudinal direction is optimally established to be approximately six point five (6.5) times the width of the tape. For example, with 0.75 inch wide tape, this distance would be 4.875 inches. The optimum location of the profile configurator is therefore a function of the tape width and the preconfigured status of the tape.

Comments are perhaps in order here to explain the importance of forcing the adhesive tape to form a lateral, openly overlapping spiral in order for this invention to operate successfully. It is apparent when considering the tape material properties that minimal resistance to bending exists. If the flat tape is simply passed through a circular hole, the circular profile of the tape cross section will be unstable and highly subject to collapse. When such collapse occurs, the profile may be represented as a crescent, resulting in a malfunction during the formation of the tape tube. Furthermore, a circular hole will not function satisfactorily as a profile configurator because collapse or disorientation will likely also occur when the formed tube is grasped and pulled during the act of tearing tubes to desired lengths. If one attempts to add a suspended disk within the center of the circular hole, and allows for clearance such that the tape may pass between the circular hole and the suspended disk during an edge to edge contacting, overlapping fashion; again a malfunction occurs because although tape edge overlapping may be initially established, tape edge overlapping will not occur continuously and automatically upon tape motion. In figurative terms, the tape 'walks' out of the overlapping condition as the tape is pulled. It is necessary, for this invention to operate properly, that overlapping edge to edge self contact not occur until after the tape has been properly configured in order that the overlapping tape edges merge together radially.

Continuing now and describing an additional element of the preferred embodiment, a tape tube compressor may advantageously be located in relatively close proximity to the output side of the configurator. The primary purpose of the compressor is due to the fact that if the user wishes to pull the formed tube at an angle which deviates vertically from the neutral or normal direction, a malfunction at the configurator will occur because the portion of tape surrounded by the configurator will tend to migrate or bunch within the configurator to the vertical direction to which the tube is pulled. The compressor prevents such tape bunching by confining the longitudinal axis of the formed tube exiting the configurator to lie within a horizontal plane. This compressor may comprise a flat plate with a hole or a slot established therein of height dimensions sufficient to significantly compress the formed tube as the tube is pulled at the neutral or non deviating angle. The width of the compressor slot must be sufficient to accommodate the width dimension of the formed tape tube when it has been substantially collapsed. With a compressor installed, the effect of pulling at such an angle will only cause the tube to be creased at its lateral sides, but for most applications where the tube is used for adhering two objects together, the presence of the two creases is irrelevant. A secondary advantage of installing a compressor is that adequate adhesive contact between the overlapping edges or longitudinal seam of the formed tube is assured, even when pulled at the neutral angle.

In continuing to discuss the compressor, an alternative design may comprise a pair of radially opposed tacking wheels which compresses the formed tube while being caused to counter rotate. Due to the fact that the formed tube has adhesive present at its outer surface, cleats may be present at the compressor wheel tread region to reduce pulling resistance, and to ensure that portions of the formed tube do not have a tendency to stick to the wheels.

Finally, two other elements are present on the preferred embodiment, a tape tube tack down platform, and a tape tube cutting blade. The tape tube tack down platform is located a sufficient distance beyond the tape tube compressor as to allow grasping of the formed tube during use of the dispenser, and is dimensioned sufficiently as to allow for adequate adhesive surface contact area of the platform against a portion of the formed tube in order to temporarily maintain the tube at a readily graspable location. This tape tube tack down platform is needful because significant tape tension is present due to the variable tape profile generated between the tape deflector and the profile configurator. This tape tension is created due to adhesive contact with the tape against the tape supply roll as the tape is being pulled off or unrolled. It may be noted that if tape (or cloth, paper, or any other ribbon type material) without adhesive is pulled through the configurator, formation of the tape tube will not occur unless tensile force is established while the tape is being transformed. In practical aspects, this would require some type of braking mechanism or brake element to be incorporated onto the dispenser to act upon the tape material while the tape is being transformed between the deflector and the configurator into the spiral cone. If tension in the tape is not present, the tape will remain flat until it is in close proximity to the configurator and thereafter fold or wrinkle. Such a malfunction is immediate and catastrophic, making it impossible to pull the tape through the configurator.

The final element, a serrated tape tube cutting blade, is located in close proximity to the tack down platform, at the side directed opposite the compressor, and provides means to cut the formed adhesive tube to any desired length.

In discussing the preferred embodiment, the distance between the tape deflector and the configurator has been optimally established to be six point five times the tape width. If the tape supply roll rotational axis is located at the side of the deflector directed away from the configurator, then at least a portion of the tape supply roll diameter would contribute to increasing the overall assembled length of the dispenser unit. In order to shorten the overall dispenser length to more efficiently use office desk space, the tape supply roll rotational axis may be positioned at some point between the tape deflector and the profile configurator, on either side of the tape path. In the two embodiments illustrated, the tape supply roll rotational axis has been illustrated above and below the tape path, but with proper orientation of the configurator, the tape supply roll rotational axis may also be located horizontally on either side of the tape path.

Having described in general some important physical aspects of the apparatus, I will continue in describing some unique physical properties of the adhesive tube the apparatus produces. One property pertains to the advantage a small diameter adhesive tube offers when securing objects to vertical surfaces such as walls and the like. When compared to the typical adhesive loops of relatively large diameter which are formed by hand, significantly heavier objects may be secured with the small diameter tube the present invention configures when the adhesive tube is orientated with the tube longitudinal axis parallel to the gravity vector. The present invention, with its ability of producing lengths of tubes of relatively small diameter, is thus capable of adhesively fixing two opposed objects during significant sustained shear load in the tube longitudinal direction without susceptibility of peeling. Other mechanical properties of the adhesive tube configured with the present invention includes characteristics of considerable tensile loading capacity, compression resistance in the tube longitudinal direction, bending resistance, very low weight, and the ability to readily adhere to most surfaces. Although such a combination may not in itself lend it to any particular utilitarian application, the inventor has discovered that children have been entertained by constructing what may be described as tape tube structures. These structures may be assembled by using the self adhesive tubes as structural members, as in framework in miniature houses and the like, followed by using blank or colored upon paper sheets for walls or roofs. Perhaps it could be said that such creative effort can provide insight into civil engineering principles due to effects observed on the structure as the tubular elements or the paper elements are placed and readily self adhere at different points and at different orientations upon the structure being built. Colored tape and glitter may be additional necessary paraphernalia in such intense activity, and some thought has even been expressed that the dispenser for this application may preferably be designed to represent some type of animal or cartoon character with the tube being pulled out of the creature's mouth.

In discussing some of the suggested tape widths one may design this apparatus to transform, the specific application of the formed tube would naturally be the criteria of concern. Most commonly, tape widths between 0.5 inch and 2 inches would be used. For a desk top dispenser, perhaps the optimum tape width would be 1.25 inches because such a tape width establishes the overall assembled dispenser length below twelve inches (in the tube longitudinal direction), and produces a tape tube or loop of one half of an inch in diameter—a size which is similar to the optimum loop diameter a person forming loops manually (with difficulty) would wish to achieve. It is unfortunate that a tape width of 1.25 inches is not customarily available, because by designing the configurator to form 1.25 inch tape, no other tape width will operate successfully, and the user must rely on specialized sources of tape rolls for resupply. It would be logical for the manufacture of the dispenser to therefore also be the supplier of the tape rolls in this instance due to economies of scale during the converting or manufacturing of such a unique tape width. For other application such as may be found in the construction industry where heavy duty applications are present, and a tubular adhesive form would have applications as in carpet tack down tape, temporary panel placement, etc., standard two inch wide cloth reinforced adhesive tape, commonly referred to as duct tape, would likely be desirable, and the dispenser manufacture need not be concerned with supplying tape. At the upper practical limit of sixty inches for the overall assembled length of the dispenser or apparatus in the tube longitudinal direction, such a dispenser would be capable of forming an adhesive tube from eight or nine inch wide adhesive tape.

In discussing how an operator would load tape or set up the apparatus, several options are available. Initially, for the first use or at any time tape is not in position within the configurator, the operator may cut the tape on a diagonal and thread it into the spiral configurator slot. A tape roll supplied with an adhesiveless leader diagonally cut at its leading end would facilitate this. If a leader is not present, folding a short length of the tape, at the end of the tape, longitudinally over onto itself with the adhesive side oriented to the interior of the fold also serves well as a pilot.

Alternatively, the user may be provided with a piece of plastic material resembling a straw of the same diameter of the formed tube, and being slit longitudinally its entire length and diagonally cut at one end. By adhering the leading end of the tape, with the adhesive side placed to bow outwardly to the end of the slit straw which has not been diagonally cut, the component may also be used as a pilot.

Despite these options available to the user to set the apparatus up, it is seldom that the user would have to resort to them because once it has been set up, roll after roll may be loaded simply by splicing the end of one roll onto the beginning of the next roll.

BRIEF DESCRIPTION OF THE DRAWINGS

The invention will be further described in conjunction with the accompanying drawings, which illustrate preferred embodiments, and wherein.

DETAILED DESCRIPTION OF THE INVENTION

Figure 1:
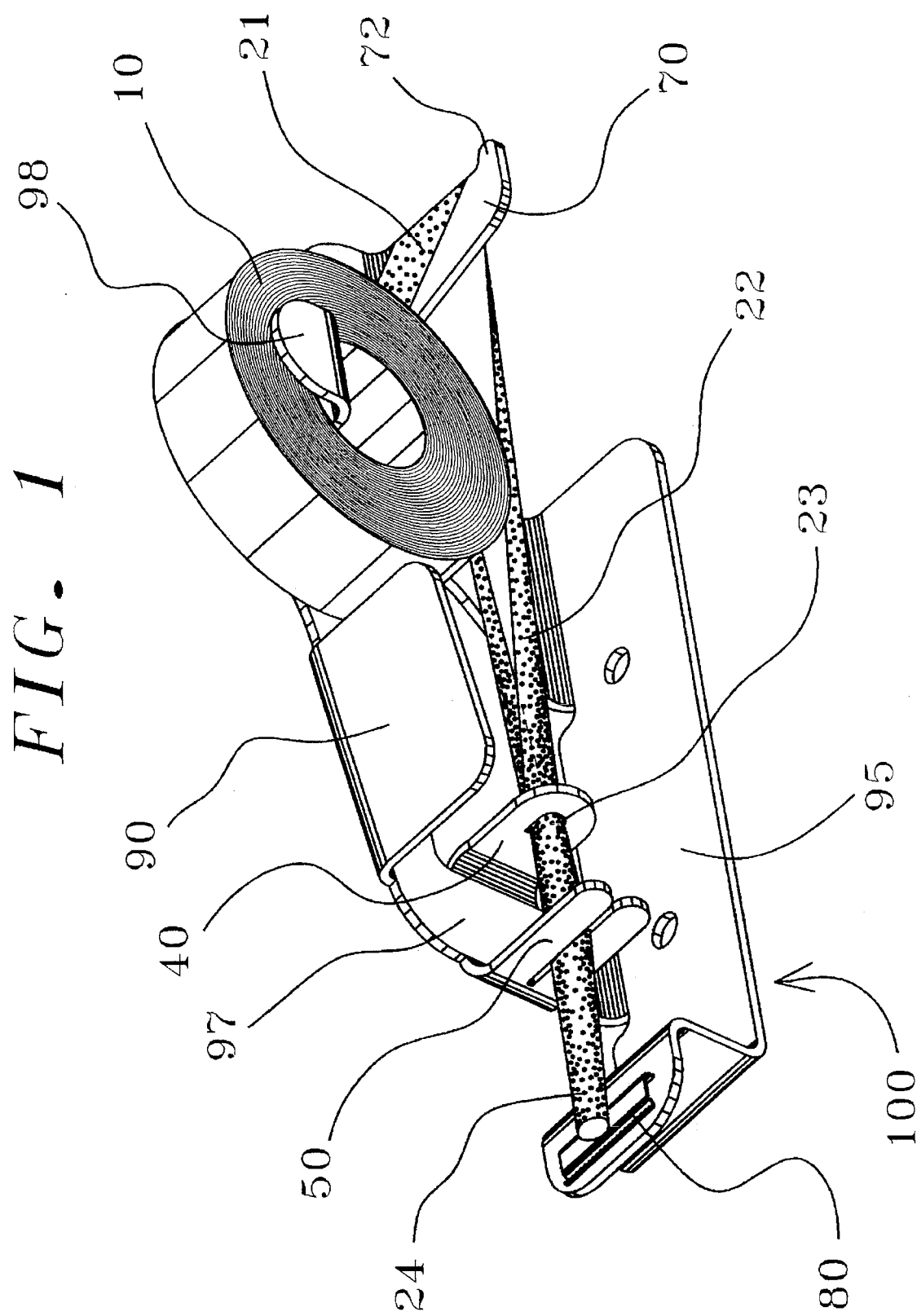
FIG. 1 is a perspective view of the first embodiment.

As shown in FIG. 1, the adhesive tape tube dispenser 100, in accordance with the first embodiment of the invention, is constructed of sheet material with bent regions. Additional methods which may be chosen to manufacture this dispenser are available, and would include for example molding individual parts which snap or glue together, or simply molding (primarily injection) the entire dispenser. With the bent up version of FIG. 1, single sided adhesive tape is stored upon tape supply roll 10 with the adhesive applied to the tape at the radially inward surface, although it is arbitrary to which side the adhesive is applied assuming the tape roll is mounted appropriately. This drawing represents a scale version of a dispenser unit which converts three quarter inch wide tape. The tape roll core, being one inch in diameter in this drawing, is rotatably supported by tape core support tab 98. As the tape 21 is drawn off the roll, the nonadhesive side of the tape will first pass over and make sliding contact with tape deflector tab 70. Tape deflector tab 70 has a tape side stop protrusion 72 to prevent the tape from inadvertently sliding sideways off the deflector, although no force influences the tape to do so. After the tape passes over tape deflector 70, the tape edges will curl upward along the tape path to form a spiral cone 22 between the tape deflector and the profile configurator 23. The profile configurator 23 comprises a spiral slot transverse to the tape path and forms the tape transversely into a spiral with the opposite tape edges overlapping without touching. Tape tension is necessary for the spiral cone to be formed, and is provided due to adhesive contact with the tape against the tape supply roll 10. The spiral slot of the configurator is established in configurator plate 40. After the tape has been formed into a spiral by passing through the configurator, the edges of the tape will merge together radially due to the tendency of the spiral to continue to close toward its longitudinal axis. In order to reduce tube closure difficulties caused by redirecting the spiral closure region to some position which deviates from its neutral straight through vector, a tube compressor may be installed to compress the tube after the tape has passed through the profile configurator. This will ensure that the opposite lateral edges of the tape will make proper mutual adhesive contact in order to produce the longitudinal seam of the tube. In this embodiment, a compressor open-ended slot has been established in compressor plate 50. After the tube has passed through the compressor slot, the adhesive tube 24 may be cut to any desire length by tearing at tube cutting blade 80.

During operation, the user may find that to facilitate use with one hand, the tape tube dispenser 100 shall preferably have mounted upon dispenser base 95 a soft material such as rubber in order to improve the friction coefficient. Holes are illustrated in the base as optional mounting means. Velcro material may also be secured to dispenser base 95, and upon the platform the dispenser is placed. The inventor, being highly resourceful, suggests that the user of this adhesive tape tube former use an adhesive tape tube for this purpose.

Continuing with FIG. 1, dispenser side 97 extends upward from dispenser base 95, and both the configurator plate 40 and the compressor plate 50 extend from the dispenser side toward the tape path. Dispenser top 90 is provided to prevent unintentional interference with the tape as it is being transformed into the spiral cone.

Figure 2:
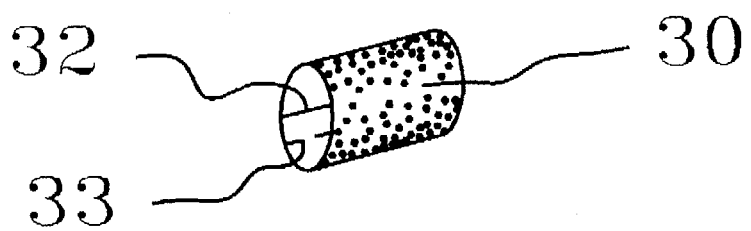
FIG. 2 is a perspective view of a short piece of tubed tape which may be referred to as a loop, capable of being formed with this invention.
Figure 3:
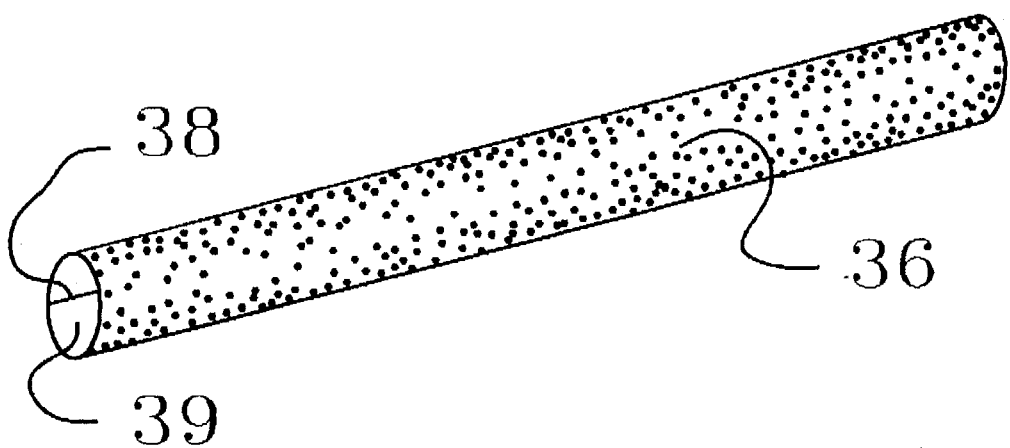
FIG. 3 is a perspective view of a long piece of tubed tape capable of being formed with this invention.

Referring now to FIG. 2, a short piece of tubed tape capable of being formed with this invention is shown with the adhesive oriented outward. This short piece 30, with inner edge 32 adheringly overlapping outer edge 33, may be commonly referred to as a tape loop due to its geometrical proportions. The long piece 36 shown in FIG. 3, with corresponding inner edge 38 and outer edge 39, due to its geometrical proportions, may be commonly referred to as tubed tape.

Figure 4:
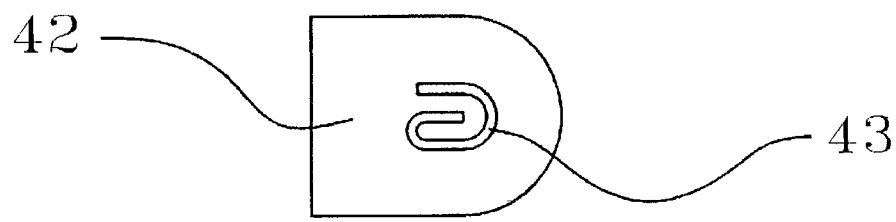
FIG. 4 is a front plan view of the profile configurator utilized in the first embodiment in which the longitudinal seam of the formed tube is orientated upward.
Figure 5:
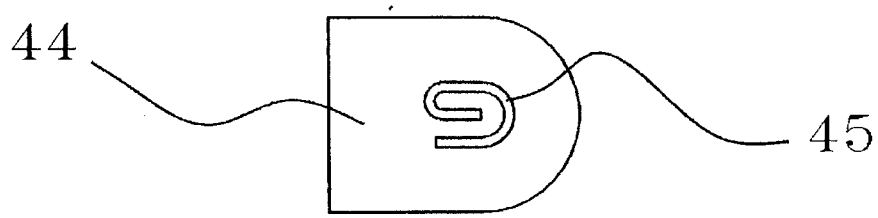
FIG. 5 is a front plan view of the profile configurator utilized in the second embodiment in which the longitudinal seam of the formed tube is orientated downward.

Directing attention now to FIG. 4, a front plan view is shown of the profile configurator utilized in the first embodiment. This configurator consists of a plate 42 of minimal thickness. This plate is by necessity thin because the tape must pass through it at arcuate slot 43, and if the plate thickness is substantial, the outward, adhesive side of the tape, will adhere to portions of the arcuate slot wall, thus causing increased tape motion resistance to the effect of a malfunction. The total length of the arcuate slot 43 is approximately equal to the total flat width of the tape which passes through it, and is established to approximate an overlapping spiral. Because the arcuate slot is overlapping at its upper region, the longitudinal seam of the tube which it forms will be located at the top of the tube. In reference to FIG. 5, the arcuate slot 45 established in configurator plate 44 overlaps at its lower region, and is therefore similar to the configurator used in the second embodiment in that the tube longitudinal seam will be created at the bottom of the tube. It may be said that for rolls of tape supplied with the adhesive directed radially inward upon each tape layer, the spiral arcuate configurator will overlap on the side directed toward the tape roll rotational axis when overall dimensions of the dispenser are minimized.

Figure 6:
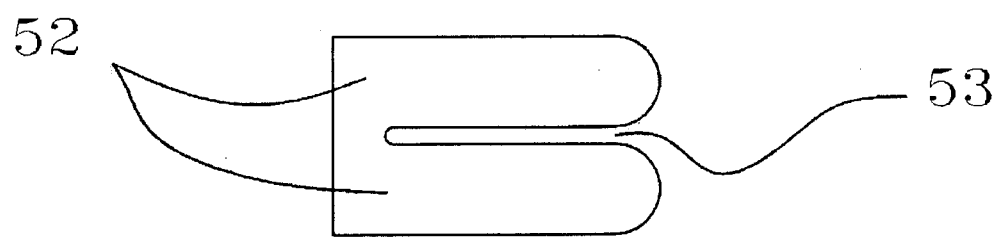
FIG. 6 is a front plan view of a tube compressor comprising an open-ended slot.

Continuing now with FIG. 6, a plan view of a compressor is shown comprising an open-ended slot 53 present in compressor plate 52. The open-ended slot facilitates threading the tube into the configurator during setup. As with the configurator plate, the thickness of the compressor plate is preferably minimal in order to reduce friction or possible adhesion when in contact with the adhesive side of the formed tube.

Figure 7:
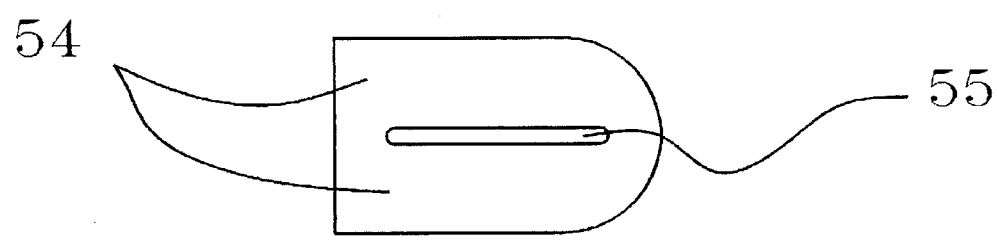
FIG. 7 is a front plan view of a tube compressor comprising a narrow hole or slot.

In reference to FIG. 7, the compressor plate 54 has compressor hole 55 of width proportion substantially greater than the height. The width of the compressor hole must be at least as great as the width of the collapsed tube. As a generality, for any give tape width, the width of the compressor hole must be at least one half of the width of the unformed tape.

Figure 8:
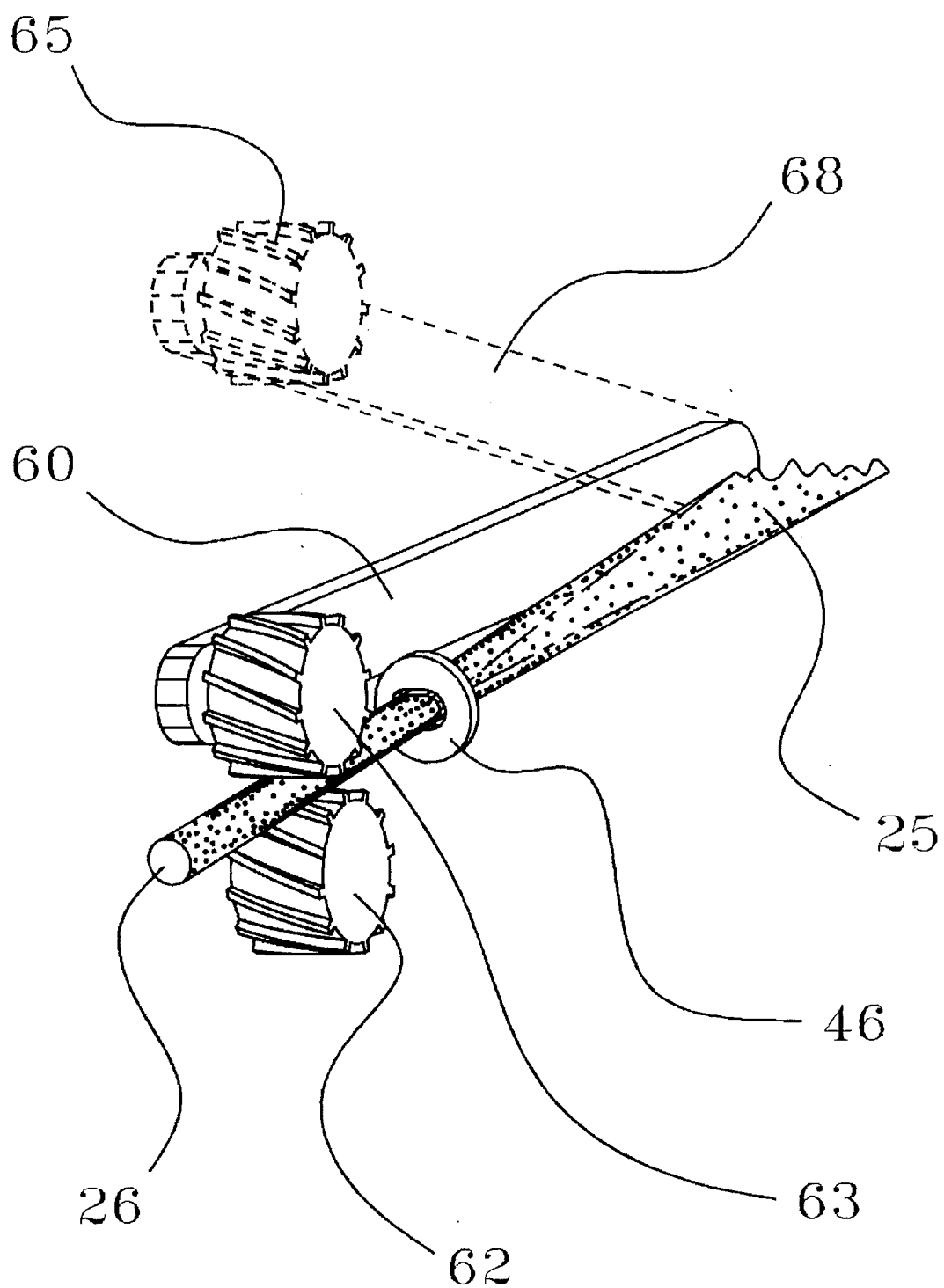
FIG. 8 is a perspective view of a tube compressor comprising two counter rotating radially opposed tacking wheels.

Referring now to FIG. 8, a compressor utilizing two radially opposed tacking wheels is illustrated in a perspective view. The adhesive tape 25 is formed into the transverse overlapping spiral at configurator 46 with the adhesive orientated outward. The formed adhesive tube 26 then passes between a lower tacking wheel 62 and an upper tacking wheel 63. The tacking wheels are rotatable, and preferably have cleats molded thereon which are designed and orientated to disallow intermeshing. These cleats press the tube longitudinal seam together at regular regions in the tube longitudinal direction as the tube is pulled. The upper tacking wheel 65 is rotatably installed upon an upper tacking wheel pivot arm 68. The upper tacking wheel pivot arm 68 and raised upper tacking wheel 65 are illustrated in dashed lines to indicate a position in which the pivot arm is swung upward facilitating setup of the dispenser.

Figure 9:
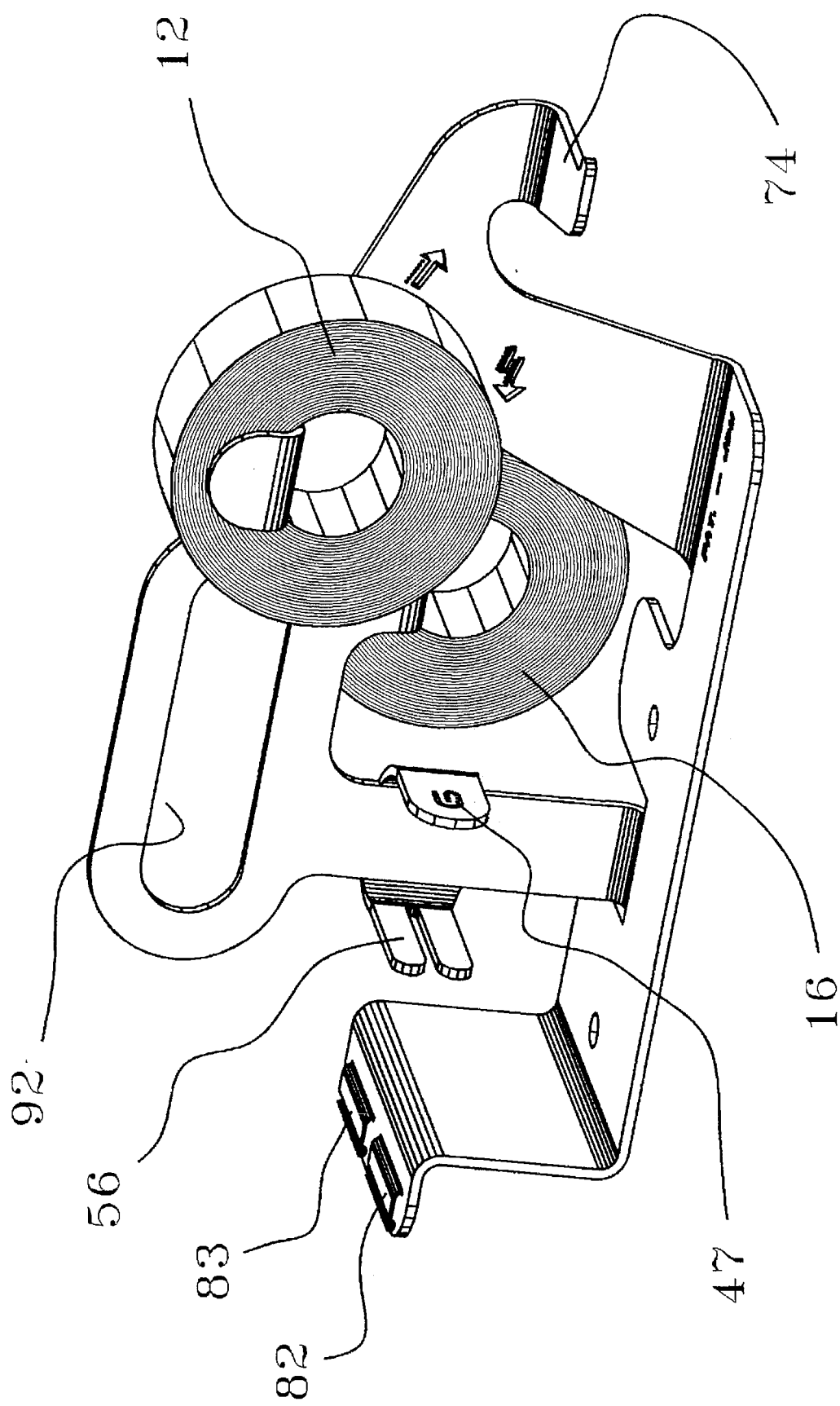
FIG. 9 is a perspective view of a variation of the first embodiment, and includes means to dispense tape in flat form.

Directing attention now to FIG. 9, a perspective view is shown of a dispenser which dispenses tape in two distinct forms. At the side directed toward the viewer, an adhesive tape roll 12 is rotatably installed and converted into an adhesive tape tube by an apparatus designed similarly to the first embodiment. The tape passes over deflector 74 and then passes through configurator 47 and compressor 56. The adhesive tape tube is cut by the operator at tube cutting blade 82. At the laterally opposite side of the dispenser, an identical tape supply roll 16 is rotatably installed, and will supply adhesive tape directly to the tape cutting blade 83 without being transformed. An optional handle 92 has been incorporated into the design to allow for portable use. Such a dual functioning dispenser would be convenient, and also reduce office or home clutter.

Figure 10:
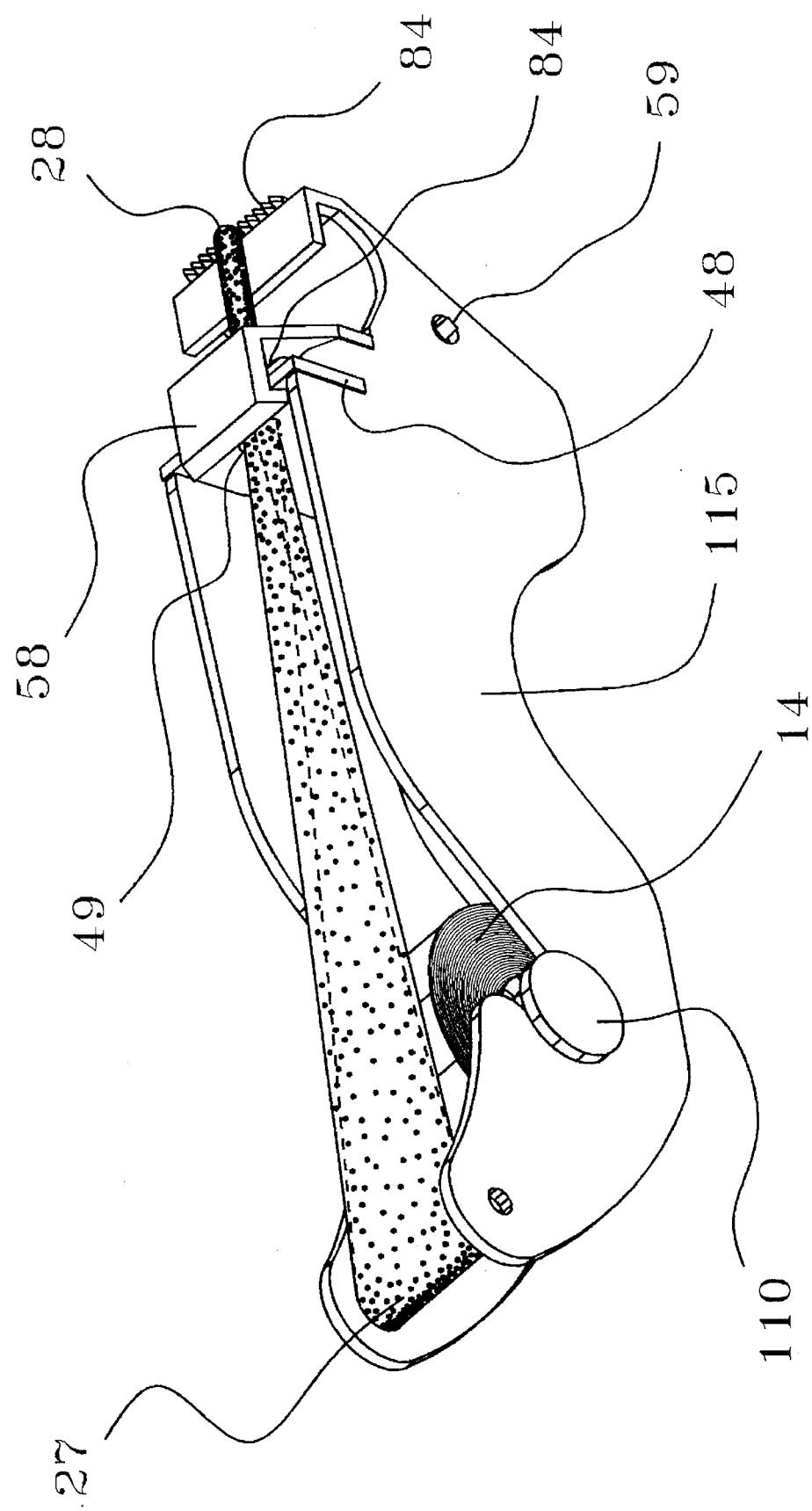
FIG. 10 is a perspective view of a second embodiment.

Referring finally now to FIG. 10, a second embodiment is illustrated of this invention. This embodiment locates the tape supply roll rotational axis below the tape transformation path. The tape supply roll 14 is rotatably secured to supply roll core axle 110. Side standards 115 have a notch to receive the supply roll core axle 110 which is orientated such that during dispenser use, the axle is self energized into the notch due to the tape tensile force generated as the tape is drawn off the roll. Gravity of course also maintains the axle in the notch. The adhesive tape passes from the supply roll 14 to a cylindrical deflector at deflector region 27. The adhesive tape is then transformed into the spiral cone due to the transverse spiral slot at configurator 49. The configurator comprises a plate 48 which seats, at each lateral side of the dispenser, into a side standard mortise. The compressor slot 57 is partially obscured by compressor latch hood 58. By lifting and unhooking the latch hood 58, the compressor may be swung forward toward the cutting blade 84 and caused to pivot about compressor pivot 59 in order to expose the configurator during setup. The configurator may optionally be slid out of the mortise and removed from the dispenser if desired. As alluded to earlier in this test, other embodiments would include molding by one of several methods in order to minimize the manufacturing cost.

Thus, an improved adhesive tape tube former has been shown which greatly expedites the tube forming process. The invention is applicable to the design and manufacture of new dispensers and to previously designed or existing dispensers.

While preferred embodiments of the invention have been shown and described, it will be apparent to those skilled in the art that changes and modifications can be made in these embodiments without departing from the principles and spirit of the invention, the scope of which is defined in the appended claims.

For example, the configurator or compressor need not contact the adhesive tape at a plane perpendicular to the longitudinal path of the tape, but rather at some oblique or variable angle.

I claim:

1. An apparatus for forming one-sided pressure sensitive adhesive tape into a tube with the adhesive oriented outwardly, which comprises:
   (a) a support,
   (b) means to rotatably secure a roll of pressure sensitive adhesive tape to said support,
   (c) a roll of pressure sensitive adhesive tape secured on said means,
   (d) a profile configurator connected to said support in order to transversely form the tape into a spiral shape with the pressure sensitive adhesive oriented outwardly, and with opposite tape edges overlapping to form the tube.

2. The apparatus of claim 1, wherein said configurator comprises a plate with an arcuate slot.

3. The apparatus of claim 2, further comprising a tape deflector connected to said support to present the tape from a constant direction to said configurator.

4. The apparatus of claim 3, further comprising a means to cut the formed tube to a desired length.

5. The apparatus of claim 4, further comprising a tack down platform positioned between said configurator and said cutting means such that upon adhering contact of a proximate outer circumferential region of the formed tube against said platform the formed tube will be maintained readily graspable.

6. The apparatus of claim 5, further comprising a compressor positioned between said configurator and said tack down platform wherein said compressor will make contact with said overlapping edges of said formed tube.

7. The apparatus claim 6, wherein the overall assembled length of the apparatus in the tube longitudinal direction is less than sixty inches.

8. The adhesive tape tube former of claim 7, wherein said means to rotatably secure said roll locates the rotational axis of said roll between said deflector and said configurator.

9. An apparatus for forming one-sided pressure sensitive adhesive tape into a tube with the adhesive oriented outwardly, which comprises:
   (a) a support,
   (b) means to rotatably secure a roll of pressure sensitive adhesive tape to said support,
   (c) a roll of pressure sensitive adhesive tape secured on said means,
   (d) a profile configurator connected to said support in order to transversely form the tape into a spiral shape with the pressure sensitive adhesive oriented outwardly and with the opposite tape edges overlapping to form the tube,
   (e) a tape deflector connected to said support to present the tape from a constant direction to said configurator,
   (f) means to cut the formed tube to a desired length,
   (g) a tack down platform positioned between said configurator and said cutting means such that upon adhering contact of a proximate outer circumferential region of the formed tube against said platform the formed tube will be maintained readily graspable.

10. The adhesive tape tube former of claim 9, wherein said configurator comprises a plate with an arcuate slot.

11. The adhesive tape tube former of claim 10, further comprising a compressor positioned between said configurator and said tack down platform wherein said compressor will make contact with said overlapping edges of said formed tube.

12. The apparatus claim 11, wherein the overall assembled length of the apparatus in the tube longitudinal direction is less than sixty inches.

13. An apparatus for forming one-sided pressure sensitive adhesive tape into a tube with the adhesive oriented outwardly, which comprises:
   (a) a support,
   (b) means to rotatably secure a roll of pressure sensitive adhesive tape to said support,
   (c) a roll of pressure sensitive adhesive tape secured on said means,
   (d) a profile configurator comprising a plate with an arcuate slot connected to said support in order to transversely form the tape into a spiral shape with the pressure sensitive adhesive oriented outwardly and with the opposite tape edges overlapping to form the tube,
   (e) a tape deflector connected to said support to present the tape from a constant direction to said configurator, (f) means to cut the formed tube to a desired length, (g) a tack down platform positioned between said configurator and said cutting means such that upon adhering contact of a proximate outer circumferential region of the formed tube against said platform the formed tube will be maintained readily graspable, (h) a compressor positioned between said configurator and said tack down platform wherein said compressor will make contact with said overlapping edges of said formed tube.

14. The adhesive tape tube former of claim 13, wherein said compressor comprises a plate with a slot.

15. The adhesive tape tube former of claim 14, wherein said compressor slot is open ended.

16. The apparatus claim 15, wherein the overall assembled length of the apparatus in the tube longitudinal direction is less than sixty inches.

17. The adhesive tape tube former of claim 14, wherein said compressor comprises a pair of radially opposed rotatable tacking wheels wherein said overlapping edges of said formed tube will pass between said pair of radially opposed rotatable tacking wheels and make contact therewith.

18. The adhesive tape tube former of claim 17, wherein said means to rotatably secure said roll locates the rotational axis of said roll between said deflector and said configurator.

19. The apparatus claim 14, wherein the overall assembled length of the apparatus in the tube longitudinal direction is less than sixty inches.

20. The apparatus claim 13, wherein the overall assembled length of the apparatus in the tube longitudinal direction is less than sixty inches.

* * * * *